(12) United States Patent
Wouters et al.

(10) Patent No.: US 8,916,618 B2
(45) Date of Patent: Dec. 23, 2014

(54) RECYCLING AN ORGANIC-MATRIX COMPOSITE MATERIAL

(75) Inventors: Maria Elizabeth Louise Wouters, Heeze (NL); Rudolf Hartmut Fischer, Mierlo (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 152 days.

(21) Appl. No.: 13/122,489

(22) PCT Filed: Oct. 13, 2009

(86) PCT No.: PCT/NL2009/050616
§ 371 (c)(1),
(2), (4) Date: Jun. 30, 2011

(87) PCT Pub. No.: WO2010/044661
PCT Pub. Date: Apr. 22, 2010

(65) Prior Publication Data
US 2011/0257279 A1    Oct. 20, 2011

(30) Foreign Application Priority Data
Oct. 13, 2008 (EP) .................................. 08166466

(51) Int. Cl.
*C08J 11/04* (2006.01)
*C08J 11/12* (2006.01)
*B29B 17/02* (2006.01)

(52) U.S. Cl.
CPC ............. *C08J 11/12* (2013.01); *B29B 17/0206* (2013.01)
USPC ............ 521/40; 528/502 R; 528/503; 209/11; 525/326.1; 501/95.2

(58) Field of Classification Search
CPC ............ C08J 11/00; C08J 11/06; C08J 11/10; C08J 11/12; B29B 17/02; B29B 17/0206
USPC ............... 521/40; 209/11; 501/11, 95.1, 95.2, 501/155; 264/37.1; 525/326.1; 528/480, 528/481, 502 R, 503
See application file for complete search history.

(56) References Cited

U.S. PATENT DOCUMENTS

| 4,983,549 A | * | 1/1991 | Greve | .............................. 501/27 |
| 5,061,735 A | * | 10/1991 | Zielinski | ...................... 521/46.5 |
| 5,312,052 A | * | 5/1994 | Dellekamp | ................ 241/24.14 |
| 5,420,166 A | * | 5/1995 | Tufts et al. | ................... 521/40.5 |
| 2002/0086952 A1 | | 7/2002 | Chino et al. | |
| 2007/0148465 A1 | | 6/2007 | Shimura et al. | |

FOREIGN PATENT DOCUMENTS

| EP | 0360171 A | 3/1990 |
| JP | 2004-250623 A | 9/2004 |

OTHER PUBLICATIONS

Bosman et al.: "Supermolecular polymers at work" Materials Today, vol. 7, No. 4, Apr. 2004, pp. 34-39.
Oku et al.: "A Concept for Recyclable Cross-Linked Polymers: Topologically Networked Polyrotaxane Capable of Undergoing Reversible Assembly and Disassembly" Angew. Chem. Int. Ed., vol. 43, 2004, pp. 966-969.
S.D. Bergman and F. Wudl: "Mendable polymers", J. Mater. Chem., vol. 18, No. 1, Nov. 27, 2007, pp. 41-62.
M. Watanabe and N. Yoshie: "Synthesis and properties of readily recyclabe polymers from bisfuranic terminated poly(ethylene adipate) and multi-maleimide linkers", Polymer, vol. 47, 2006, pp. 4946-4952.
S.A. Canary and M.P. Stevens: "Thermally Reversible Crosslinking of Polystyrene via the Furan-Maleimide Diels-Alder reaction", Journal of Polymer Science: Part A: Polymer Chemistry, vol. 30, 1992, pp. 1755-1760.
Y. Chujo et al.: "Reversible Gelation of Polyoxazoline by Means of Diels-Alder Reaction" Macromolecules, vol. 23, No. 10, 1990, pp. 2636-2641.

* cited by examiner

*Primary Examiner* — Frances Tischler
(74) *Attorney, Agent, or Firm* — Lucas & Mercanti, LLP

(57) ABSTRACT

The invention is directed to a method for recycling an organic-matrix composite material. The organic-matrix composite material comprises a first component comprising at least one organic matrix polymer and at least one solid second component being compatible with said first component and being structurally different from said first component, wherein said at least one organic polymer has thermosetting properties at room temperature and wherein said polymer comprises thermally reversible cross-links The method of the invention comprises —heating the organic-matrix composite material to a temperature at which at least part of the thermally reversible cross-links cleave and at which temperature the first component as a viscosity of at most 500 Pa·s, as measured by oscillatory measurements on an Anton Paar MCR 301 rheometer using parallel plate geometry; and —separating the at least part of said first component from said second component.

20 Claims, No Drawings

RECYCLING AN ORGANIC-MATRIX COMPOSITE MATERIAL

CROSS-REFERENCE TO RELATED APPLICATIONS

This application is a 371 of PCT/NL2009/050616 filed Oct. 13, 2009, which claims the benefit of European Patent Application No. 08166466.6 filed Oct. 13, 2008, the contents of each of which are incorporated herein by reference.

The invention is directed to a method for recycling an organic-matrix composite material.

Polymer based composites are used in a variety of applications which include transport vehicles (such as cars, aircrafts, ships, and spacecrafts), sporting goods, civil engineering, and electronics. The matrix materials of polymer-based composites classically are either thermosets like epoxy based resins or thermoplasts. A disadvantage of conventional polymer based composites, such as reinforced organic-matrix composites, is that they are susceptible to damage, for instance induced by mechanical impact. This damage not only involves the matrix polymer, but often also involves the interaction between the matrix polymer and the reinforcement material. As a result of this damage the mechanical properties of the reinforced polymer based composite is reduced, which leads to composites with poor performance. Such damage often manifests itself internally within the composite material as matrix cracks and delamination and can be difficult to detect visually, in particular when such cracks are small.

The presence of microcracks in the polymer matrix can affect both the reinforcement material and matrix dominated properties of a composite. In fibre reinforced organic-matrix polymer composites Riefsnider et al. (*American Society for Testing and Materials, Special Technical Publication* 1983, 813, 136-159) for instance predicted reductions in fibre dominated properties such as tensile strength and fatigue life due to the redistribution of loads caused by matrix damage. Jang et al. (*Polym. Compos.* 1990, 11, 144-157) and Morton et al. (*Compos. Struct.* 1989, 13, 1-19) extensively studied impact response in fibre reinforced polymer composites and found that matrix cracking causes delamination and subsequent fibre fracture. The propagation of microcracks may affect the structural integrity of the polymeric components. Reparation of conventional thermosets and thermoplasts is very difficult due to the high degree of cross-linking of thermosets, and the high viscosity and mediocre wetting properties of thermoplasts. It is highly advantageous to have a composite material that can be repaired so that the repaired composite is depleted e.g. in microcracks.

Furthermore, the recycling of composite materials is rather difficult, because the separation of the organic polymer matrix and the other component is involved and costly if not impossible. Accordingly, there is a strong demand for improvements in the recycling of composite materials.

Some attempts in recycling of materials have been made in the part art. EP-A-0 360 171 describes a process for recycling glass fibres from a composite material. This process is not based on thermally reversible cross-links and does not allow the plastic to be recycled in its original form. Watanabe et al. (*Polymer* 2006, 47, 4946-4952) describe recyclable polymeric materials in the absence of solid materials.

Object of the invention is to provide a solution for these problems that are faced in the art.

The inventors found that this object can be met by using a specific type of organic-matrix composite material, which allows easy recycling of the different components.

Accordingly, the invention is directed to a method for recycling an organic-matrix composite material, said material comprising a first component comprising at least one organic matrix polymer and at least one solid second component being compatible with said first component and being structurally different from said first component, wherein said at least one organic polymer has thermosetting properties at room temperature and wherein said polymer comprises thermally reversible cross-links, said method comprising heating the organic-matrix composite material to a temperature at which at least part of the thermally reversible cross-links cleave and at which temperature the first component has a viscosity of at most 500 Pa·s, as measured by oscillatory measurements on an Anton Paar MCR 301 rheometer using parallel plate geometry; and separating the at least part of said first component from said second component.

The thermally reversible cross-links advantageously enable repair after damage and allow reconstruction of the original composite. Thus, the composite has highly advantageous formability and reformability properties, as well as mendability properties. The use of thermally reversible cross-links allows conventional processing with the advantage of new material properties and improved service life of composite materials.

Upon heating, the polymer matrix material becomes low-viscous, which allows a readily separation of the first component and the second component. This allows simple recycling of the components (in particular the matrix material) without loss of their chemical properties. Not only do the thermally reversible cross-links allow forming or mending of the composite, also the attachment or bond of the second component (such as a reinforcement material) to the matrix polymer may be improved or may be brought back into the original state.

The term "composite" as used in this application is meant to refer to a material created by the synthetic assembly of two or more components. A first component comprising at least one matrix polymer (also referred to as a "binder" or a "bonding agent") is combined with at least one solid second component in order to provide the first component with specific characteristics and properties. An example is reinforced organic-matrix composite, in which a polymer matrix is combined with a reinforcing material to improve the mechanical properties of the polymer. The term "reinforcing material" as used in this application is meant to refer to a material that provides or maintains the composite properties in the mechanical or structural sense, such as strength, modulus, and impact strength. It refers in particular to reinforcing fibres including filaments, yarn, roving, mats, felt, ribbon, tape, fabric, woven or non-woven and the like. It is noted in this respect that a reinforcing material and a filler material are not necessarily the same. Fillers can have a wide variety of functions, which do not necessarily have to include a reinforcing function. Reinforcing materials on the other hand have the above mentioned very specific function.

The term "laminate" as used in the present specification and claims is defined as a preferred composite construction made by bonding multiple flat layers or sheets of the first and second component, usually in combination with pressure and heat, into a composite composition. The layers or sheets can be a homogeneous mixture of the first and second components, but also designs wherein the first and second components are inhomogeneously distributed in the layers or sheets are possible.

The term "compatible" as used in the present application is meant to refer to the situation wherein the first component and the second component can be comingled to form a mixed hybrid composition, wherein at the interface between the first component and the second component (preferably the interface between a reinforcement material and an organic polymer), the first component and the second component have a dominant adhesion and no dominant repulsion.

Preferably, in the heating step the organic matrix-composite material is heated at least 5 K above the $T_g$ of the organic matrix polymer, more preferably at least 10 K. Heating the organic matrix-composite material to a temperature more than 75 K above the $T_g$ of the organic matrix polymer can be detrimental for the organic matrix polymer. Therefore, the heating step is preferably at most 50 K above the $T_g$ of the organic matrix polymer, more preferably at most 40 K above the $T_g$ of the organic matrix polymer. In a preferred embodiment, the organic-matrix composite material is heated 5-50 K above the $T_g$ of the organic matrix polymer, more preferably 10-40 K above the $T_g$ of the organic matrix polymer.

The duration of the heating step of the recycling method of the invention can vary widely and is e.g. dependent on the size and form of the organic matrix-composite material. Also the type of organic matrix polymer and the type of solid second component can be of influence for the duration of the heating step. In an embodiment, the organic matrix-composite material is heated until at least 90% of the thermally reversible cross-links have been cleaved, preferably at least 95%, more preferably at least 98%, even more preferably essentially all of the thermally reversible cross-links have been cleaved.

Heating is performed to a temperature at which the first component has a viscosity of at most 500 Pa·s, as measured by oscillatory measurements on an Anton Paar MCR 301 rheometer using parallel plate geometry. In an embodiment, the viscosity of at most 500 Pa·s, is measured by oscillatory measurements on an Anton Paar MCR 301 rheometer using parallel plate geometry at a temperature of 175° C., at an amplitude of 1 mrad and a frequency of 1 Hz.

Separating at least part of the first component from the second component is then relatively simple, as the second component is solid, while the first component has become flowable. Separation can e.g. involve filtration, decantation, centrifugation, sedimentation, and/or flotation.

The ease of recyclability of the organic-matrix composites of the invention is a highly desirably property, for which a strong demand exists. By simply heating the composite material, the different components (e.g. matrix polymer and reinforcement material) can be separated and collected. The matrix polymer can thus be reused without being contaminated with reinforcement material and the reinforcement material can be reused without being contaminated with matrix polymer. Separation may for instance be based on the difference in viscosity induced by the cleavage of thermally reversible cross-links. The method of the invention allows recycling of the matrix materials without loss of properties. According to conventional recycling techniques either the polymeric matrix is degraded and only the reinforcement material is recovered, or chips of the composite material are used as reinforcement material for new composites having inferior mechanical properties. Thus, the invention surprisingly provides a composite material, wherein the different components are highly compatible to each other, but when desired can be easily separated and recycled.

Thermoreversible cross-links are known in the art. For instance, U.S. Pat. No. 5,641,856 describes a re-moldable cross-linked resin having polymer chains which are connected to one another via Diels-Alder adducts obtained from a dienophile and a diene.

U.S. Pat. No. 3,435,003 describes polymer products having thermally reversible cross-linking, and which comprise chains of saturated condensation polymer backbones bearing furan groups reacted with maleimides.

U.S. Pat. No. 4,273,909 describes a one-part solvent-free thermosettable composition useful as adhesive and coating. The composition comprises a prepolymer having terminal isocyanate substituents, a difunctional primary or secondary amine or alcohol chain extender, a monofunctional primary or secondary amino or alcohol chain terminator, and a specific dienophile. The dienophile undergoed Diels-Alder ring formation with furyl or furfuryl groups IV, thereby serving as a cross-linking agent.

U.S.-A-2002/0 086 952 is directed to an elastomer composition comprising an elastomer having a functional group, and a compound having an additional functional group, wherein a cross-link is formed and cleaved reversibly between said functional group of said elastomer and said additional functional group of said compound with temperatures. This document does not mention the presence of a reinforcing material.

U.S.-A-2003/0 116 272 describes a thermally-removable, polymeric adhesive for reversibly attaching different solid parts.

The thermoreversible cross-links can be based on a number of mechanisms, such as an ionic bond, a hydrogen bond, a Diels-Alder reaction, nitroso dimerisation, ester formation (such as cyclic anhydride reactions in which ester bonds are formed), ionene formation, urethane formation, azlactone-phenol adduct formation, metal-ligand coordination, or combinations thereof.

In a preferred embodiment, the thermoreversible cross-links are at least in part based on the reversible Diels-Alder reaction. Such reactions between a diene and a dienophile, are known and potentially useful in forming cross-linked materials. The rate of reaction between a diene and dienophile is determined by the individual components and the substituents on them. Typically, upon heating, the equilibrium between adduct and dienophile/diene shifts to increase the amount of the diene and dienophile. This is advantageous, since it leads to the cleavage of cross-links at elevated temperatures, whereas at lower temperatures the cross-links reform. Thus, at relatively low temperatures (typically room temperature) the polymer matrix of the composite exists as a non-deformable network having high viscosity and high mechanical strength. However, upon elevating the temperature, at least part of the thermally reversible cross-links are cleaved thereby lowering the viscosity and mechanical strength of the matrix polymer and at the same time reducing the bond strength between the matrix polymer and the reinforcement material. This results in a deformable composite material.

Good results have been obtained with a matrix polymer wherein the reversible Diels-Alder reaction comprises a reaction between a bismaleimide with a substituted furan, said bismaleimide and said substituted furan being bound to the matrix polymer through a spacer.

The at least one matrix polymer used in the organic-matrix composite is an organic polymer. Epoxy-based polymers can suitably be used in the composite of the invention, in particular because such polymers in general adhere well to the second component and hardly give rise to foaming. However, also other polymers can be used, such as polyurethanes, poly (meth)acrylates, polyesters, or vinyl esters. Vinyl esters and epoxy-based polymers are preferred as these polymers are less sensitive to degradation by ultraviolet radiation. The most preferred polymers are epoxy-based polymers. These polymers have the advantage of being hardly coloured and relatively transparent. Moreover, a wide variety of epoxy-based polymers is readily available for relatively low cost, they have excellent strength, and are easy to handle. It is also possible to use a polymer blend in the composite.

The at least one organic matrix polymer has thermosetting properties at room temperature. The expression "has thermosetting properties at room temperature" as used in this application is meant to indicate that at room temperature the polymer is in a cured cross-linked form. The expression is not intended to indicate that the polymer remains solid upon heating. To the contrary, due to the thermoreversible cross-links of the at least one organic polymer of the invention the polymer becomes liquid or flowable at elevated temperatures.

Organic-matrix composite materials comprising such polymers (that have thermosetting properties at room temperature) have properties (such as solvent resistance, hardness, stiffness, toughness, etc.) that are comparable to the properties of conventionally cross-linked materials, but advantageously are thermoplastically processable as well. Moreover, these composite materials remain thermoplastically processable for many repetitions.

The matrix polymers suitably have functional side-groups that provide them with the thermally reversible cross-links. These functional groups offer a wide range of possible matrix polymers with thermally reversible cross-links, which allows a tailoring of the material properties by choosing the desired material components for the matrix material.

The at least one organic polymer can for instance comprise one or more functional groups A that can form thermoreversible cross-links with one or more functional groups B. Preferably, the functional groups A are selected from the group consisting of furane, anthracene, thiophene, and pyrrole groups. More preferably, the one or more functional groups A comprise furane groups. Preferably, the functional groups B are selected from the group consisting of maleimide, furamate, maleate, and alkyne groups. More preferably, the one or more functional groups B comprise maleimide groups.

Good results have been obtained with the polymers described in WO-A-2004/076567, which is herewith incorporated by reference. These polymers were found to be highly compatible with and show a favourable interaction with reinforcement materials, such as clay, pigment, glass fibre, carbon fibre, and aramid fibre.

The second component can comprise a material used to alter or tailor the properties of the composite, such as the mechanical properties, the electrical conductivity, the thermal conductivity, and/or the magnetic properties of the composite. Suitable examples of reinforcement materials include glass, carbon, aramid, ceramics (such as $Al_2O_3$, SiC and the like), metals, cellulose, and the like. Naturally, also mixtures of reinforcement materials can be used.

The at least one second component can comprise particles having different types of geometries. Suitable geometries of the reinforcement material for instance include fibres, platelets, needles, rods, spheres, and cubes.

The at least one second component can suitably comprise a fibrous reinforcement material. Preferred fibrous reinforcement materials include glass fibre, carbon fibre, and aramid fibre.

In a preferred embodiment, the at least one second component comprises a fibrous sheet or fabric. The sheet or fabric can suitably be a woven or a non-woven and can comprise one or more fibrous reinforcement materials as mentioned herein. These materials provide the composite with particularly good reinforcing properties and upon heating the recycling of these materials is remarkably simple due to the macroscopic scale of these materials.

It is possible to bond multiple fibrous sheets or fabrics with the polymer matrix and thereby obtain a laminate composite construction. Usually, the bonding process is performed in combination with pressure and heat. Such laminates are advantageous, because they can be produced and formed in a specific shape after the laminate production. A flat shaped production is easier and less costly upon storage than complex shaped geometries. In addition the flexibility of the end-user is improved, since the final shape can be produced on site without the need for large storage capacity. Therefore, in an embodiment the invention is directed to a method for recycling an organic-matrix composite material in the form of a laminate.

The organic-matrix composites can be prepared by a method comprising
  providing the first component and the at least one second component in a mould;
  moulding the combined first and second component at elevated temperature and under pressure to form an object; and
  cooling the object.

The first component can for instance be provided in the mould in the form of a powder. The second component can suitably be provided in the mould in the form of a sheet or fabric. In another embodiment, the first component and the second component are provided into the mould as a powder mixture, preferably a homogeneous powder mixture.

Moulding is carried out at elevated temperature and under pressure for a short period of time. The exact applied temperature, pressure and time strongly depend on the type of materials used. Based on conventional moulding techniques the skilled person will be able to apply suitable conditions. A possible moulding temperature can for instance be in the range of 50-250° C., preferably in the range of 125-175° C., depending on the material and application. The moulding time depends on the temperature and can for instance be from 3 seconds to 3 days, preferably from 3 seconds to 30 minutes. The person skilled in the art can determine the optimum pressure in order to obtain an end product with the desired properties.

By mildly heating the object, it can be formed as desired. In this respect, mildly heating can for instance be 5-50 K above the $T_g$ of the organic matrix polymer.

The organic-matrix composite material can be reformed or mended in a method, comprising
  heating the organic-matrix composite material to a temperature at which at least part of the cross-links cleave;
  reforming the organic-matrix composite material or the laminate; and
  cooling the reformed organic-matrix composite material to a temperature at which at least part of the cleaved cross-links reform.

The temperature at which at least part of the cross-links cleave can for instance be 5-50 K above the $T_g$ of the organic matrix polymer.

Not only can the organic-matrix composite material be visually reformed into a new shape or into its original shape, but it is also possible to mend or reform the structural integrity of the composite matrix material in order to improve the mechanical properties or the performance of the composite material. Furthermore, in this manner delamination in organic-matrix composite laminates can be repaired. Advantageously, the method for reforming or mending the organic-matrix composite material does not require the use of a solvent.

For example, composite panels can easily be repaired on site, which enables reformation of a complete structural integrity of the matrix including the re-wetting and bonding of delaminated fibres or reinforcing elements. Another example, which may be envisaged, is the quick and easy repair of composite panels by adhesion of a new panel of the same material on top enabling a perfect structural connection between the damaged area and the new repair while using the same matrix material. Welding lines/surfaces can thus be avoided.

The invention claimed is:

1. Method for recycling a reinforced organic-matrix composite material, said material comprising a first component comprising at least one organic matrix polymer and at least one solid second component being compatible with said first component and being structurally different from said first component, wherein said at least one organic polymer has thermosetting properties at room temperature, wherein said at least one solid second component is a reinforcing material, wherein said reinforcing material includes reinforcing fibers, and wherein said polymer comprises thermally reversible cross-links, said method comprising
   heating the organic-matrix composite material to a temperature 5-75 K above the $T_g$ of the organic matrix polymer at which at least part of the thermally reversible cross-links cleave and at which temperature the organic matrix polymer has a viscosity of at most 500 Pa·s, as measured by oscillatory measurements on an Anton Paar MCR 301 rheometer using parallel plate geometry;
   separating the at least part of the organic matrix polymer from said reinforcing material; and
   collecting said separated organic matrix polymer and reinforcing material, wherein said separated organic matrix polymer and reinforcing material are suitable for re-use in their original functions.

2. Method according to claim 1, wherein said thermally reversible cross-links are based on a reversible Diels-Alder reaction.

3. Method according to claim 1, wherein said at least one organic polymer comprises an epoxy-based polymer.

4. Method according to claim 1, wherein said at least one organic polymer comprises a (meth)acrylate polymer.

5. Method according to claim 1, wherein said at least one second component comprises one or more selected from the group consisting of glass, carbon, aramid, ceramics, metals, and cellulose.

6. Method according to claim 1, wherein said fibrous material is in the form of a woven or non-woven fabric.

7. Method according to claim 2, wherein said reversible Diels-Alder reaction comprises a reaction between a bismaleimide with a substituted furan, said bismaleimide and said substituted furan being bound to said at least one organic polymer through a spacer.

8. Method according to claim 1, wherein said organic-matrix composite material is a laminate.

9. Method according to claim 1, wherein said fibrous material is selected from the group consisting of glass fibers, carbon fibers and aramid fibers.

10. Method according to claim 1, wherein the reinforced organic-matrix composite material is heated until at least 90% of the thermally reversible cross-links have been cleaved.

11. Method according to claim 1, wherein the reinforced organic-matrix composite material is heated until at least 95% of the thermally reversible cross-links have been cleaved.

12. Method according to claim 1, wherein the reinforced organic-matrix composite material is heated until at least 98% of the thermally reversible cross-links have been cleaved.

13. Method according to claim 1, wherein the reinforced organic-matrix composite material is heated until essentially all of the thermally reversible cross-links have been cleaved.

14. Method according to claim 1, wherein said at least one organic matrix polymer has thermosetting properties at room temperature and becomes flowable upon heating to the temperature at which at least part of the thermally reversible cross-links cleave and at which temperature the first component has a viscosity of at most 500 Pa·s.

15. Method according to claim 1, wherein the reinforced organic-matrix composite is heated to a temperature of 5-50 K above the $T_g$ of the organic matrix polymer.

16. Method according to claim 1, wherein the reinforced organic-matrix composite is heated to a temperature of 10-40 K above the $T_g$ of the organic matrix polymer.

17. Method according to claim 1, wherein the separation involves one or more selected from the group consisting of filtration, decantation, centrifugation, sedimentation, and flotation.

18. Method according to claim 1, further comprising
   reusing the matrix polymer; and
   reusing the reinforcing material.

19. Method according to claim 18, wherein the matrix composition is reused without being contaminated with reinforcement material and wherein said reinforcement material is reused without being contaminated with matrix polymer.

20. Method according to claim 1, wherein said method omits a solvent.

* * * * *